United States Patent
Collins et al.

[11] Patent Number: 5,848,159
[45] Date of Patent: Dec. 8, 1998

[54] PUBLIC KEY CRYPTOGRAPHIC APPARATUS AND METHOD

[75] Inventors: Thomas Collins, Saratoga; Dale Hopkins, Gilroy; Susan Langford; Michael Sabin, both of Sunnyvale, all of Calif.

[73] Assignee: Tandem Computers, Incorporated, Cupertino, Calif.

[21] Appl. No.: 784,453

[22] Filed: Jan. 16, 1997

Related U.S. Application Data

[60] Provisional application No. 60/033,271, Dec. 9, 1996.

[51] Int. Cl.$^6$ ................. H04L 9/30; H04L 9/00
[52] U.S. Cl. ................. 380/30; 380/9; 380/29; 380/49
[58] Field of Search ................. 380/9, 28, 29, 380/30, 49, 50

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,514,592 | 4/1985 | Kawamura et al. ................ 380/28 X |
| 4,995,082 | 2/1991 | Schnorr ................ 380/23 |
| 5,046,094 | 9/1991 | Kawamujra et al. ................ 380/28 X |
| 5,321,752 | 6/1994 | Iwamura et al. ................ 380/28 X |
| 5,351,298 | 9/1994 | Smith ................ 380/30 |

OTHER PUBLICATIONS

*RSA Moduli Should Have 3 Prime Factors* by Captain Nemo, No Date or Publication Given.
International Search Report (PCT), ISA/US; Apr. 6, 1998.

*Primary Examiner*—Bernarr E. Gregory
*Attorney, Agent, or Firm*—Robert J. Bennett, Esq.; Townsend & Townsend & Crew LLP

[57] ABSTRACT

A method and apparatus are disclosed for improving public key encryption and decryption schemes that employ a composite number formed from three or more distinct primes. The encryption or decryption tasks may be broken down into sub-tasks to obtain encrypted or decrypted sub-parts that are then combined using a form of the Chinese Remainder Theorem to obtain the encrypted or decrypted value. A parallel encryption/decryption architecture is disclosed to take advantage of the inventive method.

13 Claims, 2 Drawing Sheets

PUBLIC KEY CRYPTOGRAPHIC APPARATUS AND METHOD

This application claims the benefit of U.S. Provisional Application No. 60/033,271 for PUBLIC KEY CRYTOGRAPHIC APPARATUS AND METHOD, filed Dec. 9, 1996, naming as inventors, Thomas Colins, Dale Hopkins, Susan Langford and Michale Sabin, the discolsure of which is incorporated by reference.

BACKGROUND OF THE INVENTION

This invention relates generally to communicating data in a secure fashion, and more particularly to a cryptographic system and methods using public key cryptography.

Computer systems are found today in virtually every walk of life for storing, maintaining, and transferring various types of data. The integrity of large portions of this data, especially that portion relating to financial transactions, is vital to the health and survival of numerous commercial enterprises. Indeed, as open and unsecured data communications channels for sales transactions gain popularity, such as credit card transactions over the Internet, individual consumers have an increasing stake in data security.

Thus, for obvious reasons, it is important that financial transaction communications pass from a sender to an intended receiver without intermediate parties being able to interpret the transferred message.

Cryptography, especially public key cryptography, has proven to be an effective and convenient technique of enhancing data privacy and authentication. Data to be secured, called plaintext, is transformed into encrypted data, or ciphertext, by a predetermined encryption process of one type or another. The reverse process, transforming ciphertext into plaintext, is termed decryption. Of particular importance to this invention is that the processes of encryption and decryption are controlled by a pair of related cryptographic keys. A "public" key is used for the encryption process, and a "private" key is used to decrypt ciphertext. The public key transforms plaintext to ciphertext, but cannot be used to decrypt the ciphertext to retrieve the plaintext therefrom.

As an example, suppose a Sender A wishes to send message M to a recipient B. The idea is to use public key E and related private key D for encryption and decryption of M. The public key E is public information while D is kept secret by the intended receiver. Further, and importantly, although E is determined by D, it is extremely difficult to compute D from E. Thus the receiver, by publishing the public key E, but keeping the private key D secret, can assure senders of data encrypted using E that anyone who intercepts the data will not be able to decipher it. Examples of the public key/private key concept can be found in U.S. Pat. Nos. 4,200,770, 4,218,582, and 4,424,414.

The prior art includes a number of public key schemes, in addition to those described in the above-identified patents. Over the past decade, however, one system of public key cryptography has gained popularity. Known generally as the "RSA" scheme, it is now thought by many to be a worldwide defacto standard for public key cryptography. The RSA scheme is described in U.S. Pat. No. 4,405,829 which is fully incorporated herein by this reference.

The RSA scheme capitalizes on the relative ease of creating a composite number from the product of two prime numbers whereas the attempt to factor the composite number into its constituent primes is difficult. The RSA scheme uses a public key E comprising a pair of positive integers n and e, where n is a composite number of the form $$n = p \cdot q \tag{1}$$

where p and q are different prime numbers, and e is a number relatively prime to (p−1) and (q−1); that is, e is relatively prime to (p−1) or (q−1) if e has no factors in common with either of them. Importantly, the sender has access to n and e, but not to p and q. The message M is a number representative of a message to be transmitted wherein $$0 \leq M \leq n-1. \tag{2}$$

The sender enciphers M to create ciphertext C by computing the exponential $$C = M^e (\bmod\ n). \tag{3}$$

The recipient of the ciphertext C retrieves the message M using a (private) decoding key D, comprising a pair of positive integers d and n, employing the relation $$M = C^d (\bmod\ n) \tag{4}$$

As used in (4), above, d is a multiplicative inverse of $$e(\bmod(\mathrm{lcm}((p-1), (q-1)))) \tag{5}$$

so that $$e \cdot d = 1(\bmod(\mathrm{lcm}((p-1), (q-1)))) \tag{6}$$

where lcm((p−1), (q−1)) is the least common multiple of numbers p−1 and q−1. Most commercial implementations of RSA employ a different, although equivalent, relationship for obtaining d:

$$d = e^{-1} \bmod (p-1)(q-1). \tag{7}$$

This alternate relationship simplifies computer processing.

Note: Mathematically (6) defines a set of numbers and (7) defines a subset of that set. For implementation, (7) or (6) usually is interpreted to mean d is the smallest positive element in the set.)

The net effect is that the plaintext message M is encoded knowing only the public key E (i.e., e and n). The resultant ciphertext C can only decoded using decoding key D. The composite number n, which is part of the public key E, is computationally difficult to factor into its components, prime numbers p and q, a knowledge of which is required to decrypt C.

From the time a security scheme, such as RSA, becomes publicly known and used, it is subjected to unrelenting attempts to break it. One defense is to increase the length (i.e., size) of both p and q. Not long ago it was commonly recommended that p and q should be large prime numbers 75 digits long (i.e., on the order of $10^{75}$). Today, it is not uncommon to find RSA schemes being proposed wherein the prime numbers p and q are on the order of 150 digits long. This makes the product of p and q a 300 digit number. (There are even a handful of schemes that employ prime numbers (p and q) that are larger, for example 300 digits long to form a 600 digit product.) Numbers of this size, however, tend to require enormous computer resources to perform the encryption and decryption operations. Consider that while computer instruction cycles are typically measured in nanoseconds (billionths of seconds), computer computations of RSA steps are typically measured in milliseconds (thousandths of seconds). Thus millions of computer cycles are required to compute individual RSA steps resulting in noticeable delays to users.

This problem is exacerbated if the volume of ciphertext messages requiring decryption is large—such as can be expected by commercial transactions employing a mass communication medium such as the Internet. A financial institution may maintain an Internet site that could conceivably receive thousands of enciphered messages every hour that must be decrypted, and perhaps even responded to. Using larger numbers to form the keys used for an RSA scheme can impose severe limitations and restraints upon the institution's ability to timely respond.

Many prior art techniques, while enabling the RSA scheme to utilize computers more efficiently, nonetheless have failed to keep pace with the increasing length of n, p, and q.

Accordingly, it is an object of this invention to provide a system and method for rapid encryption and decryption of data without compromising data security.

It is another object of this invention to provide a system and method that increases the computational speed of RSA encryption and decryption techniques.

It is still another object of this invention to provide a system and method for implementing an RSA scheme in which the components of n do not increase in length as n increases in length.

It is still another object to provide a system and method for utilizing multiple (more than two), distinct prime number components to create n.

It is a further object to provide a system and method for providing a technique for reducing the computational effort for calculating exponentiations in an RSA scheme for a given length of n.

SUMMARY OF THE INVENTION

The present invention discloses a method and apparatus for increasing the computational speed of RSA and related public key schemes by focusing on a neglected area of computation inefficiency. Instead of $n=p \cdot q$, as is universal in the prior art, the present invention discloses a method and apparatus wherein n is developed from three or more distinct prime numbers; i.e., $n=p_1 \cdot p_2 \cdot \ldots \cdot p_k$, where k is an integer greater than 2 and $p_1, p_2, \ldots p_k$ are sufficiently large distinct primes. Preferably, "sufficiently large primes" are prime numbers that are numbers approximately 150 digits long or larger. The advantages of the invention over the prior art should be immediately apparent to those skilled in this art. If, as in the prior art, p and q are each on the order of, say, 150 digits long, then n will be on the order of 300 digits long. However, three primes $p_2$, $p_1$, and $p_3$ employed in accordance with the present invention can each be on the order of 100 digits long and still result in n being 300 digits long. Finding and verifying 3 distinct primes, each 100 digits long, requires significantly fewer computational cycles than finding and verifying 2 primes each 150 digits long.

The commercial need for longer and longer primes shows no evidence of slowing; already there are projected requirements for n of about 600 digits long to forestall incremental improvements in factoring techniques and the ever faster computers available to break ciphertext. The invention, allowing 4 primes each about 150 digits long to obtain a 600 digit n, instead of two primes about 350 digits long, results in a marked improvement in computer performance. For, not only are primes that are 150 digits in size easier to find and verify than ones on the order of 350 digits, but by applying techniques the inventors derive from the Chinese Remainder Theorem (CRT), public key cryptography calculations for encryption and decryption are completed much faster—even if performed serially on a single processor system. However, the inventors' techniques are particularly adapted to be advantageously apply enable public key operations to parallel computer processing.

The present invention is capable of using the RSA scheme to perform encryption and decryption operation using a large (many digit) n much faster than heretofore possible. Other advantages of the invention include its employment for decryption without the need to revise the RSA public encryption transformation scheme currently in use on thousands of large and small computers.

A key assumption of the present invention is that n, composed of 3 or more sufficiently large distinct prime numbers, is no easier (or not very much easier) to factor than the prior art, two prime number n. The assumption is based on the observation that there is no indication in the prior art literature that it is "easy" to factor a product consisting of more than two sufficiently large, distinct prime numbers. This assumption may be justified given the continued effort (and failure) among experts to find a way "easily" to break large component numbers into their large prime factors. This assumption is similar, in the inventors' view, to the assumption underlying the entire field of public key cryptography that factoring composite numbers made up of two distinct primes is not "easy." That is, the entire field of public key cryptography is based not on mathematical proof, but on the assumption that the empirical evidence of failed sustained efforts to find a way systematically to solve NP problems in polynomial time indicates that these problems truly are "difficult."

The invention is preferably implemented in a system that employs parallel operations to perform the encryption, decryption operations required by the RSA scheme. Thus, there is also disclosed a cryptosystem that includes a central processor unit (CPU) coupled to a number of exponentiator elements. The exponentiator elements are special purpose arithmetic units designed and structured to be provided message data M, an encryption key e, and a number n (where $n=p_1 * p_2 * \ldots p_k$, k being greater than 2) and return ciphertext C according to the relationship, $$C=M^e (\mod(n)).$$

Alternatively, the exponentiator elements may be provided the ciphertext C, a decryption (private) key d and n to return M according to the relationship, $$M=C^d (\mod(n))$$

According to this aspect of the invention, the CPU receives a task, such as the requirement to decrypt cyphertext data C. The CPU will also be provided, or have available, a public key e and n, and the factors of n ($p_1$, $p_2$, ... $p_k$). The CPU breaks the encryption task down into a number of sub-tasks, and delivers the sub-tasks to the exponentiator elements. When the results of the sub-tasks are returned by the exponentiator elements to the CPU which will, using a form of the CRT, combine the results to obtain the message data M. An encryption task may be performed essentially in the same manner by the CPU and its use of the exponentiator elements. However, usually the factors of n are not available to the sender (encryptor), only the public key, e and n, so that no sub-tasks are created.

In a preferred embodiment of this latter aspect of the invention, the bus structure used to couple the CPU and exponentiator elements to one another is made secure by encrypting all important information communicated thereon. Thus, data sent to the exponentiator elements is passed through a data encryption unit that employs, preferably, the ANSI Data Encryption Standard (DES). The exponentiator elements decrypt the DES-encrypted sub-task information they receive, perform the desired task, and encrypt the result, again using DES, for return to the CPU.

DETAILED DESCRIPTION OF PREFERRED EMBODIMENTS

Figure 1:
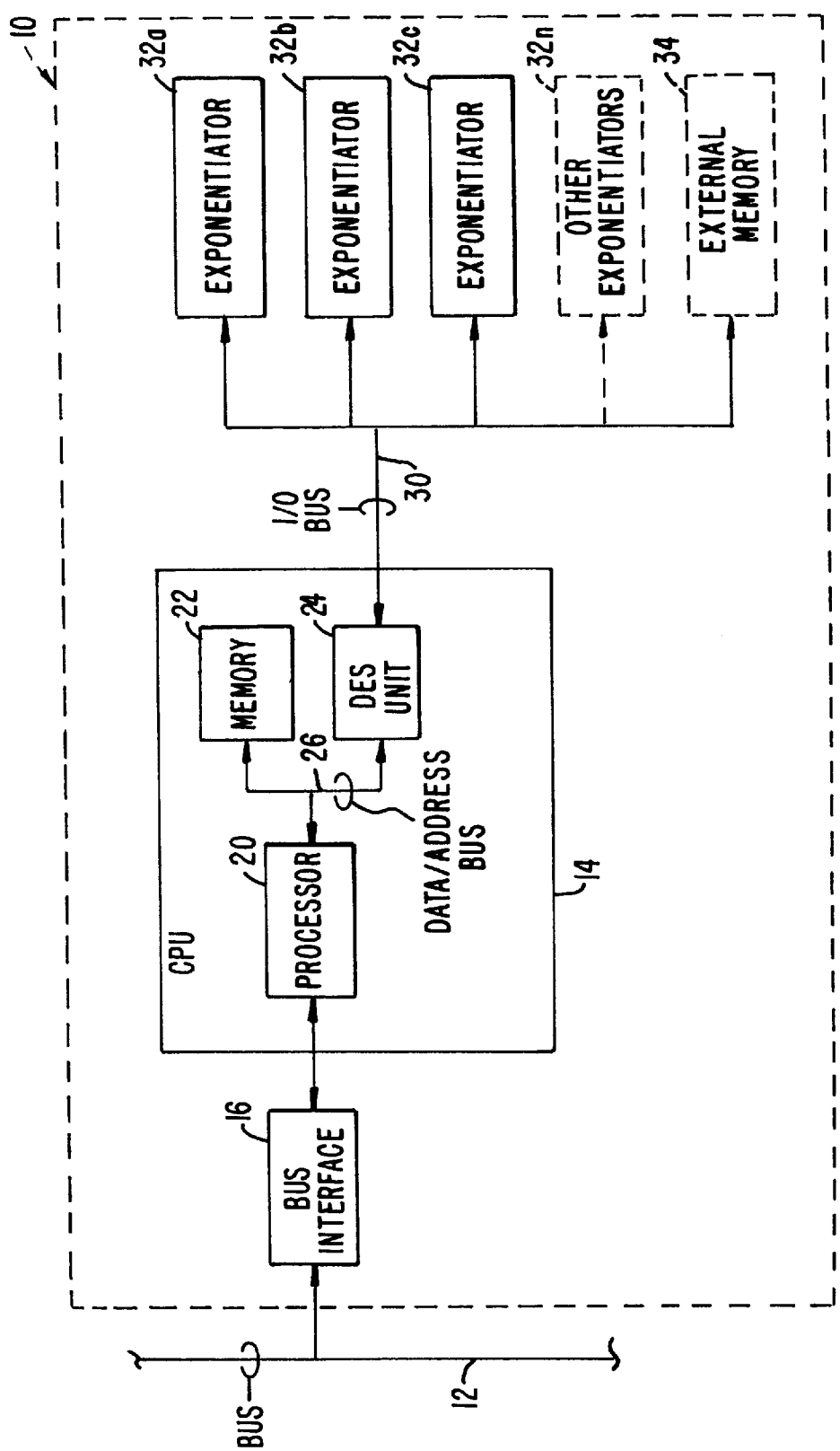
FIG. 1 is a simplified block diagram of a cryptosystem architecture configured for use in the present invention.

As indicated above, the present invention is employed in the context of the RSA public key encryption/decryption scheme. As also indicated, the RSA scheme obtains its security from the difficulty of factoring large numbers, and the fact that the public and private keys are functions of a pair of large (100–200 digits or even larger) prime numbers. Recovering the plaintext from the public key and the ciphertext is conjectured to be equivalent to factoring the product of two primes.

According to the present invention, the public key portion e is picked. Then, three or more random large, distinct prime numbers, $p_1, p_2, \ldots, p_k$ are developed and checked to ensure that each is relatively prime to e. Preferably, the prime numbers are of equal length. Then, the product $n=p_1, p_2, \ldots, p_k$ is computed.

Finally, the decryption key, d, is established by the relationship:

$$d=e^{-1} \mod ((p_1-1)(p_2-1) \ldots (p_k-1))$$

The message data, M is encrypted to ciphertext C using the relationship of (3), above, i.e., $$C=M^e \mod n.$$

To decrypt the ciphertext, C, the relationship of (3), above, is used:

$$M=C^d \mod n$$

where n and d are those values identified above.

Using the present invention involving three primes to develop the product n, RSA encryption and decryption time can be substantially less than an RSA scheme using two primes by dividing the encryption or decryption task into sub-tasks, one sub-task for each distinct prime. (However, breaking the encryption or decryption into subtasks requires knowledge of the factors of n. This knowledge is not usually available to anyone except the owner of the key, so the encryption process can be accelerated only in special cases, such as encryption for local storage. A system encrypting data for another user performs the encryption process according to (3), independent of the number of factors of n. Decryption, on the other hand, is performed by the owner of a key, so the factors of n are generally known and can be used to accelerate the process.) For example, assume that three distinct primes, $p_1, p_2$, and $p_3$, are used to develop the product n. Thus, decryption of the ciphertext, C, using the relationship $$M=C^d (\mod n)$$

is used to develop the decryption sub-tasks:

$$M_1 = C_1^{d_1} \mod p_1$$

$$M_2 = C_2^{d_2} \mod p_2$$

$$M_3 = C_3^{d_3} \mod p_3$$

where $C_1 = C \mod p_1$;

$C_2 = C \mod p_2$;

$C_3 = C \mod p_3$;

$d_1 = d \mod (p_1-1)$;

$d_2 = d \mod (p_2-1)$; and $d_3 = d \mod (p_3-1)$.

The results of each sub-task, $M_1$, $M_2$, and $M_3$ can be combined to produce the plaintext, M, by a number of techniques. However, it is found that they can most expeditiously be combined by a form of the Chinese Remainder Theorem (CRT) using, preferably, a recursive scheme. Generally, the plaintext M is obtained from the combination of the individual sub-tasks by the following relationship:

$$Y_i = Y_{i-1} + [(M_i - Y_{i-1})(w_i^{-1} \mod p_i) \mod p_i] \cdot w_i \mod n$$

where $i \geq 2$ and $$M = Y_k, Y_1 = C_1, \text{ and } w_i = \prod_{j<i} p_j$$

Encryption is performed in much the same manner as that used to obtain the plaintext M, provided (as noted above) the factors of n are available. Thus, the relationship $$C=M^e (\mod n),$$

can be broken down into the three sub-tasks, $$C_1 = M_1^{e_1} \mod p_1$$

$$C_2 = M_2^{e_2} \mod p_2$$

$$C_3 = M_3^{e_3} \mod p_3$$

where $M_1 = M (\mod p_1)$, $M_2 = M (\mod p_2)$, $M_3 = M (\mod p_3)$, $e_1 = e \mod (p_1-1)$, $e_2 = e \mod (p_2-1)$, and $e_3 = e \mod (p_3-1)$ In generalized form, the decrypted message M can be obtained by the same summation identified above to obtain the ciphertext C from its contiguous constituent sub-tasks $C_i$.

Preferably, the recursive CRT method described above is used to obtain either the ciphertext, C, or the deciphered plaintext (message) M due to its speed. However, there may be occasions when it is beneficial to use a non-recursive technique in which case the following relationships are used:

$$M = \sum_{i=1}^{k} M_i(w_i^{-1} \bmod p_i) w_i \bmod n$$

where $$w_i = \prod_{j \neq 1} p_j, \text{ and}$$

k is the number (3 or more) of distinct primes chosen to develop the product n.

Thus, for example above (k=3), M is constructed from the returned sub-task values $M_1$, $M_2$, $M_3$ by the relationship $$M=M_1(w_1^{-1}\bmod p_1)\ w_1\bmod/n+M_2(w_2^{-1}\bmod p_2)\ w_2\bmod n +M_3(w_3^{-1}\bmod p_3)\ w_3\bmod n$$

where $$w_1=p_2p_3,\ w_2=p_1p_3,\text{ and }w_3=p_1p_2.$$

Employing the multiple distinct prime number technique of the present invention in the RSA scheme can realize accelerated processing over that using only two primes for the same size n. The invention can be implemented on a single processor unit or even the architecture disclosed in the above-referenced U.S. Pat. No. 4,405,829. The capability of developing sub-tasks for each prime number is particularly adapted to employing a parallel architecture such as that illustrated in FIG. 1.

Turning to FIG. 1, there is illustrated a cryptosystem architecture apparatus capable of taking particular advantage of the present invention. The cryptosystem, designated with the reference numeral 10, is structured to form a part of a larger processing system (not shown) that would deliver to the cryptosystem 10 encryption and/or decryption requests, receiving in return the object of the request—an encrypted or decrypted value. The host would include a bus structure 12, such as a peripheral component interface (PCI) bus for communicating with the cryptosystem 10.

As FIG. 1 shows, The cryptoprocessor 10 includes a central processor unit (CPU) 14 that connects to the bus structure 12 by a bus interface 16. The CPU 14 comprises a processor element 20, a memory unit 22, and a data encryption standard (DES) unit 24 interconnected by a data/address bus 26. The DES unit 24, in turn, connects to an input/output (I/O) bus 30 (through appropriate driver/receiver circuits— not shown).

The I/O bus 30 communicatively connects the CPU to a number of exponentiator elements $32_a$, $32_b$, and $32_c$. Shown here are three exponentiator elements, although as illustrated by the "other" exponentiators $32_n$, additional exponentiator elements can be added. Each exponentiator element is a state machine controlled arithmetic circuit structured specifically to implement the relationship described above. Thus, for example, the exponentiator 32a would be provided the values $M_1$, $e_1$, and p, n to develop $C_1$. Similarly, the exponentiator circuits 32b and 32c develop $C_2$ and $C_3$ from corresponding subtask values $M_2$, $e_2$, $P_2$, $M_3$, $e_3$, and $P_3$.

Preferably, the CPU 14 is formed on a single integrated circuit for security reasons. However, should there be a need for more storage space than can be provided by the "on-board" memory 22, the bus 30 may also connect the CPU 14 to an external memory unit 34.

In order to ensure a secure environment, it is preferable that the cryptosystem 10 meet the Federal Information Protection System (FIPS) level 3. Accordingly, the elements that make up the CPU 14 would be implemented in a design that will be secure from external probing of the circuit. However, information communicated on the I/O bus 30 between the CPU 14 and the exponentiator circuits 32 (and external memory 34—if present) is exposed. Consequently, to maintain the security of that information, it is first encrypted by the DES unit 24 before it is placed on the I/O bus 30 by the CPU 14. The exponentiator circuits 32, as well as the external memory 34, will also include similar DES units to decrypt information received from the CPU, and later to encrypt information returned to the CPU 14.

It may be that not all information communicated on the I/O bus 30 need be secure by DES encryption. For that reason, the DES unit 24 of the CPU 14 is structured to encrypt outgoing information, and decrypt incoming information, on the basis of where in the address space used by the cryptosystem the information belongs; that is, since information communicated on the I/O bus 30 is either a write operation by the CPU 14 to the memory 34, or a read operation of those elements, the addresses assigned to the secure addresses and non-secure addresses. Read or write operations conducted by the CPU 14 using secure addresses will pass through the DES unit 24 and that of the memory 34. Read or write operations involving non-secure addresses will by-pass these DES units.

Figure 2:
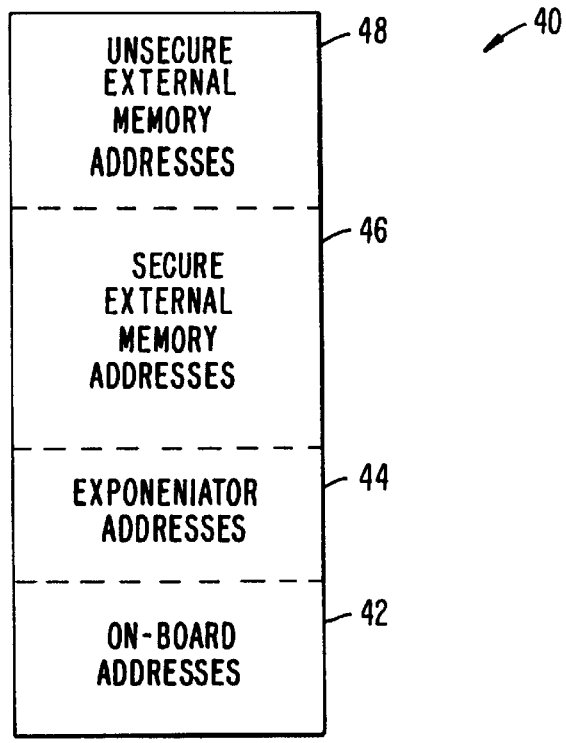
FIG. 2 is a memory map of the address space of the cryptosystem of FIG. 1.

FIG. 2 diagrammatically illustrates a memory map 40 of the address space of the cryptosystem 10 that is addressable by the processor 20. As the memory map 40 shows, an address range 40 provides addresses for the memory 22, and such other support circuitry (e.g., registers—not shown) that may form a part of the CPU 14. The addresses used to write information to, or read information from, the exponentiator elements 32 are in the address range 44 of the memory map 40. The addresses for the external memory 34 are in the address ranges 46, and 48. The address ranges 44 and 46 are for secure read and write operations. Information that must be kept secure, such as instructions for implementing algorithms, encryption/decryption keys, and the like, if maintained in external memory 34, will be stored at locations having addresses in the address range 46. Information that need not be secure such as miscellaneous algorithms data, general purpose instructions, etc. are kept in memory locations of the external memory 34 having addresses within the address range 48.

The DES unit 24 is structured to recognize addresses in the memory spaces 44, 46, and to automatically encrypt the information before it is applied to the I/O bus 30. The DES unit 24 is bypassed when the processor 20 accesses addresses in the address range 48. Thus, when the processor 20 initiates write operations to addresses within the memory space within the address range 46 (to the external memory 34), the DES unit 24 will automatically encrypt the information (not the addresses) and place the encrypted information on the I/O bus 30. Conversely, when the processor 20 reads information from the external memory 34 at addresses within the address range 46 of the external memory 34, the DES unit will decrypt information received from the I/O bus 30 and place the decrypted information on the data/address bus 26 for the processor 20.

In similar fashion, information conveyed to or retrieved from the exponentiators 32 by the processor 20 by write or read operations at addresses within the address range 44. Consequently, writes to the exponentiators 32 will use the DES unit 24 to encrypt the information. When that (encrypted) information is received by the exponentiators 32, it is decrypted by on-board DES units (of each exponentiator 32). The results of the task performed by the exponentiator 32 is then encrypted by the exponentiator's on-board DES unit, retrieved by the processor 20 in encrypted form and then decrypted by the DES unit 24.

Information that need not be maintained in secure fashion to be stored in the external memory 34, however, need only be written to addresses in the address range 48. The DES unit 24 recognizes writes to the address range 48, and bypasses the encryption circuitry, passing the information, in unencrypted form, onto the I/O bus 30 for storing in the external memory 34. Similarly, reads of the external memory 34 using addresses within the address range 48 are passed directly from the I/O bus 30 to the data/address bus 26 by the DES unit 24.

In operation, the CPU 14 will receive from the host it serves (not shown), via the bus 12, an encryption request. The encryption request will include the message data M to be encrypted and, perhaps, the encryption keys e and n (in the form of the primes $p_1, p_2, \ldots p_k$). Alternatively, the keys may be kept by the CPU 14 in the memory 22. In any event, the processor 20 will construct the encryption sub-tasks $C_1, C_2, \ldots, C_k$ for execution by the exponentiators 32.

Assume, for the purpose of the remainder of this discussion, that the encryption/decryption tasks performed by the cryptosystem 10, using the present invention, employs only three distinct primes, $p_1, p_2, p_3$. The processor 20 will develop the sub tasks identified above, using M, e, $p_1$ $p_2$, $p_3$ Thus, for example, if the exponentiator 32a were assigned the sub-task of developing $C_1$, the processor would develop the values $M_1$, $e_1$, and $(p_1-1)$ and deliver units (write) these values, with n, to the exponentiator 32a. Similar values will be developed by the processor 20 for the sub-tasks that will be delivered to the exponentiators 32b and 32c.

In turn, the exponentiators 32 develop the values $C_1$, $C_2$, and $C_3$ which are returned to (retrieved by) the CPU 14. The processor 20 will then combine the values $C_1$, $C_2$, and $C_3$ to form C, the ciphertext encryption of M, which is then returned to the host via the bus 12.

Figure 3:
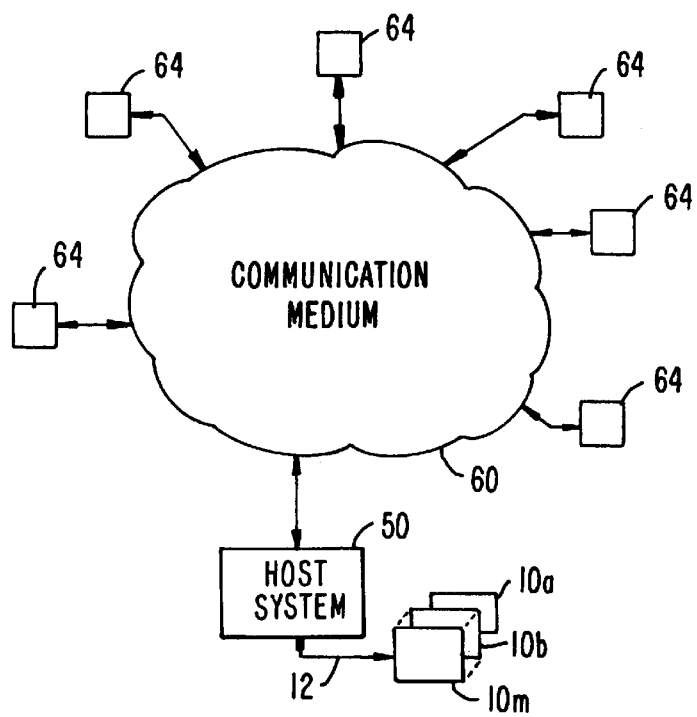
FIG. 3 is an exemplary illustration of one use of the invention.

The encryption, decryption techniques described hereinabove, and the use of the cryptosystem 10 (FIG. 1) can find use in a number of diverse environments. Illustrated in FIG. 3 is one such environment. FIG. 3 shows a host system 50, including the bus 12 connected to a plurality of cryptosystems 10 (10a, 10b, ..., 10m) structured as illustrated in FIG. 1, and described above. In turn, the host system 50 connects to a communication medium 60 which could be, for example, an internet connection that is also used by a number of communicating stations 64. For example, the host system 50 may be employed by a financial institution running a web site accessible, through the communication medium, by the stations 64. Alternatively, the communication medium may be implemented by a local area network (LAN) or other type network. Use of the invention described herein is not limited to the particular environment in which it is used, and the illustration in FIG. 3 is not meant to limit in any way how the invention can be used.

As an example, the host system, as indicated, may receive encrypted communication from the stations 64, via the communication medium 60. Typically, the data of the communication will be encrypted using DES, and the DES key will be encrypted using a public key by the RSA scheme, preferably one that employs three or more distinct prime numbers for developing the public and private keys.

Continuing, the DES encrypted communication, including the DES key encrypted with the RSA scheme, would be received by the host system. Before decrypting the DES communication, it must obtain the DES key and, accordingly, the host system 50 will issue, to one of the cryptosystems 10 a decryption request instruction, containing the encrypted DES key as the cyphertext C. If the (private) decryption keys, d, n (and its component primes, $p_1, p_2, \ldots p_k$) are not held by the cryptosystem 10, they also will be delivered with the encryption request instruction.

In turn, the cryptosystem 10 would decrypt the received cyphertext in the manner described above (developing the sub-tasks, issuing the sub-tasks to the exponentiator 32 of the cryptosystem 10, and reassembling the results of the sub-task to develop the message data: the DES key), and return to the host system the desired, decrypted information.

Alternatively, the post-system 50 may desire to deliver, via the communication medium 60, an encrypted communication to one of the stations 64. If the communication is to be encrypted by the DES scheme, with the DES key encrypted by the RSA scheme, the host system would encrypt the communication, forward the DES key to one of the cryptosystems 10 for encryption via the RSA scheme. When the encrypted DES key is received back from the cryptosystem 10, the host system can then deliver to one or more of the stations 64 the encrypted message.

Of course, the host system 50 and the stations 64 will be using the RSA scheme of public key encryption/decryption. Encrypted communications from the stations 64 to the host system 50 require that the stations 64 have access to the public key E (E, N) while the host system maintains the private key D (D, N, and the constituent primes, $p_1, p_2, \ldots, p_k$). Conversely, for secure communication from the host system 50 to one or more of the stations 64, the host system would retain a public key E' for each station 64, while the stations retain the corresponding private keys E'.

Other techniques for encrypting the communication could used. For example, the communication could be entirely encrypted by the RSA scheme. If, however, the communication greater than n−1, it will need to be broken up into blocks size M where $$0 \leq M \leq N-1.$$

Each block M would be separately encrypted/decrypted, using the public key/private key RSA scheme according to that described above.

What is claimed:

1. A method for establishing cryptographic communications comprising the step of:

encoding a plaintext message word M to a ciphertext word signal C, where M corresponds to a number representative of a message and $$0 \leq M \leq n-1$$

n being a composite number formed from the product of $p_1 \cdot p_2 \cdot \ldots \cdot p_k$ where k is an integer greater than 2, $p_1, p_2, \ldots p_k$ are distinct prime numbers, and where C is a number representative of an encoded form of message word M, wherein said encoding step comprises the step of:

transforming said message word signal M to said ciphertext word signal C whereby $$C = M^e (\bmod n)$$

where e is a number relatively prime to $(p_1-1) \cdot (p_2-1)$.

2. The method according to claim 1, comprising the further step of:

decoding the ciphertext word signal C to the message word signal M, wherein said decoding step comprises the step of: transforming said ciphertext word signal C, whereby:

$$M \equiv C^d (\bmod\ n)$$

where d is a multiplicative inverse of $e(\bmod(\text{lcm}((p_1-1), (p_2-1), \ldots, (p_k-1))))$.

3. A method for transferring a message signal $M_i$ in a communications system having j terminals, wherein each terminal is characterized by an encoding key $E_i=(e_i, n_i)$ and decoding key $D_i=(d_i, n_i)$, where $i=1, 2, \ldots, j$, and wherein $M_i$ corresponds to a number representative of a message-to-be-transmitted from the $i^{th}$ terminal, $n_i$ is a composite number of the form $$n_i = p_{i,1} \cdot p_{i,2} \cdot \ldots \cdot p_{i,k}$$

where k is an integer greater than 2, $p_{i,1}, p_{i,2}, \ldots, p_{i,k}$ are distinct prime numbers, $e_i$ is relatively prime to $\text{lcm}(p_{i,1}-1, p_{i,2}-1, p_{i,k}-1)$ $d_i$ is selected from the group consisting of the class of numbers equivalent to a multiplicative inverse of $$e_i(\bmod(\text{lcm}((p_{i,1}-1), (p_{i,2}-1), \ldots, (p_{i,k}-1)))),$$

comprising the step of:

encoding a digital message word signal $M_A$ for transmission from a first terminal (i=A) to a second terminal (i=B), said encoding step including the sub-step of:

transforming said message word signal $M_A$ to one or more message block word signals $M_A''$, each block word signal $M_A''$ corresponding to a number representative of a portion of said message word signal $M_A$ in the range $0 \leq M_A'' \leq n_B-1$, transforming each of said message block word signals $M_A''$ to a ciphertext word signal $C_A$, $C_A$ corresponding to a number representative of an encoded form of said message block word signal $M_A''$, whereby:

$$C_A \equiv M_A''^{eB} (\bmod\ n_B).$$

4. A cryptographic communications system comprising:

a communication medium;

an encoding means coupled to said channel and adapted for transforming a transmit message word signal M to a ciphertext word signal C and for transmitting C on said channel, where M corresponds to a number representative of a message and $0 \leq M \leq n-1$ where n is a composite number of the form $$n = p_1 \cdot p_2 \cdot \ldots \cdot p_k$$

where k is an integer greater than 2 and $p_1, p_2, \ldots, p_k$ are distinct prime numbers, and where C corresponds to a number representative of an enciphered form of said message and corresponds to $$C \equiv M^e (\bmod\ n)$$

where e is a number relatively prime to $\text{lcm}(p_1-1, p_2-1, \ldots, p_k-1)$; and a decoding means coupled to said channel and adapted for receiving C from said channel and for transforming C to a receive message word signal M' where M' corresponds to a number representative of a deciphered form of C and corresponds to $$M' \equiv C^d (\bmod\ n)$$

where d is selected from the group consisting of the class of numbers equivalent to a multiplicative inverse of $$e(\bmod(\text{lcm}((p_1-1), (p_2-1), \ldots, (p_k-1)))).$$

5. A cryptographic communications system having a plurality of terminals coupled by a communications channel, including a first terminal characterized by an associated encoding key $E_A=(e_A, n_A)$ and decoding key $D_A=(d_A, n_A)$, wherein $n_A$ is a composite number of the form $$n_A = p_{A,1} \cdot p_{A,2} \cdot \ldots \cdot p_{A,k}$$

where k is an integer greater than 2, $p_{A,1}, p_{A,2}, \ldots, p_{A,k}$ are distinct prime numbers, $e_A$ is relatively prime to $$\text{lcm}(p_{A,1}-1, p_{A,2}-1, \ldots, p_{A,k}-1),$$

$d_A$ is selected from the group consisting of the class of numbers equivalent to a multiplicative inverse of $$e_A(\bmod(\text{lcm}((p_{A,1}-1), (p_{A,2}-1), \ldots, (p_{A,k}-1)))),$$

and including a second terminal, comprising:

blocking means for transforming a message-to-be-transmitted from said second terminal to said first terminal to one or more transmit message word signals $M_B$, where $M_B$ corresponds to a number representative of said message in the range $$0 \leq M_B \leq n_A-1,$$

encoding means coupled to said channel and adapted for transforming each transmit message word signal $M_B$ to a ciphertext word signal $C_B$ and for transmitting $C_B$ on said channel, where $C_B$ corresponds to a number representative of an enciphered form of said message and corresponds to $$C_B \equiv M_B^{eA} (\bmod\ n_A)$$

wherein said first terminal comprises:

decoding means coupled to said channel and adapted for receiving said ciphertext word signals $C_B$ from said channel and for transforming each of said ciphertext word signals to a receive message word signal $M_B$, and means for transforming said receive message word signals M' to said message, where M' is a number representative of a deciphered form of $C_B$ and corresponds to $$M_B' \equiv C_B^{dA} (\bmod\ n_A).$$

6. The system according to claim 5 wherein said second terminal is characterized by an associated encoding key $E_B=(e_B, n_B)$ and decoding key $DB=(D_B, d_B)$, where:

$n_B$ is a composite number of the form $$n_B = p_{B,1} \cdot p_{B,2} \cdot \ldots \cdot p_{B,k}$$

where k is an integer greater than 2, $p_{B,1}, p_{B,2}, \ldots, p_{B,k}$ are distinct prime numbers, $e_B$ is relatively prime to $$\text{lcm}(p_{B,1}-1, p_{B,2}-1, \ldots, p_{B,k}-1),$$

$d_B$ is selected from the group consisting of the class of numbers equivalent to a multiplicative inverse of $$e_B(\text{mod}(\text{lcm}((p_{B,1}), (p_{B,2}-1), \ldots, (p_{B,k}-1)))),$$

wherein said first terminal comprises:
blocking means for transforming a message-to-be-transmitted from said first terminal to said second terminal, to one or more transmit message word signals $M_A$, where $M_A$ corresponds to a number representative of said message in the range $$0 \leq M_A^{eB}(\text{mod } n_B)$$

encoding means coupled to said channel and adapted for transforming each transmit message word signal $M_A$ to a ciphertext word signal $C_A$ and for transmitting $C_A$ on said channel,
where $C_A$ corresponds to a number representative of an enciphered form of said message and corresponds to $$C_A \equiv M_A^{eB}(\text{mod } n_B)$$

wherein said second terminal comprises;
decoding means coupled to said channel and adapted for receiving said ciphertext word signals $C_A$ from said channel and for transforming each of said ciphertext word signals to a receive message word signal $M_A'$, and means for transforming said receive message word signals $M_A$ to said message,
where M' corresponds to a number representative of a deciphered form of C and corresponds to $$M_A' \equiv C_A^{dB}(\text{mod } n_B).$$

7. A method for establishing cryptographic communications comprising the step of:
encoding a digital message word signal M to a cipher text word signal C, where M corresponds to a number representative of a message and $$0 \leq M \leq n-1,$$

where n is a composite number having at least 3 whole number factors greater than one, the factors being distinct prime numbers, and
where C corresponds to a number representative of an encoded form of message word M,
wherein said encoding step comprises the step of:
transforming said message word signal M to said ciphertext word signal C whereby $$C \equiv a_e M^e + a_{e-1} M^{e-1} + \ldots + a_0 (\text{mod } n)$$

where e and $a_e, a_{e-1}, \ldots, a_0$ are numbers.

8. In the method according to claim 7 where said encoding step includes the step of transforming M to C by the performance of a first ordered succession of invertible operations on M, the further step of:
decoding C to M by the performance of a second ordered succession of invertible operations on C, where each of the invertible operations of said second succession is the inverse of a corresponding one of said first succession, and wherein the order of said operations in said second succession is reversed with respect to the order of corresponding operations in said first succession.

9. A communication system for transferring message signals $M_i$, comprising:
j stations, each of the j stations being characterized by an encoding key $E_i=(e_i, n_i)$ and decoding key $D_i=(d_i, n_i)$, where i=1,2, …,j, and wherein
$M_i$ corresponds to a number representative of a message signal to be transmitted from the $i^{th}$ terminal, and $$0 \leq M_i \leq n_i-1,$$

$n_i$ is a composite number of the form $$n_i = p_{i,1} \cdot p_{i,2} \cdot \ldots \cdot p_{i,k}$$

where k is an integer greater than 2,
$p_{i,1}, p_{i,2}, \ldots, p_{i,k}$ are distinct prime numbers,
$e_i$ is relatively prime to $\text{lcm}(p_{i,1}-1, p_{i,2}-1, \ldots, p_{i,k}-1)$,
$d_i$ is selected from the group consisting of the class of numbers equivalent to a multiplicative inverse of $$e_i(\text{mod}(\text{lcm}((p_{i,1}-1), (p_{i,2}-1), \ldots, (p_{i,k}-1))));$$

a first one of the j terminals including
means for encoding a digital message word signal $M_A$ for transmission from said first terminal (i=A) to a second one of the j terminals (i=B), and
means for transforming said message word signal $M_A$ to a signed message word signal $M_{As}$, $M_{As}$ corresponding to a number representative of an encoded form of said message word signal $M_A$, whereby:

$$M_{As} \equiv M_A^{dA}(\text{mod } n_A).$$

10. The system of claim 9 further comprising:
means for transmitting said signal message word signal $M_{As}$ from said first terminal to said second terminal, and wherein said second terminal includes means for decoding said signed message word signal $M_{As}$ to said message word signal $M_A$, said second terminal including:
means for transforming said signed message word signal $M_{AS}$ to said message word signal $M_A$, whereby $$M_A \equiv M_{As}^{eA}(\text{mod } n_A).$$

11. A communications system for transferring a message signal $M_i$, the communications system comprising
j communication stations each characterized by an encoding key $E_i=(e_i, n_i)$ and decoding key $D_i=(d_i, n_i)$, where i=1, 2, …, j, and wherein $M_i$ corresponds to a number representative of a message signal to be transmitted from the $i^{th}$ terminal, $n_i$ is a composite number of the form $$n_i = p_{i,1} \cdot p_{i,2} \cdot \ldots \cdot p_{i,k}$$

where
k is an integer greater than 2,
$p_{i,1}, p_{i,2}, \ldots, p_{i,k}$ are distinct prime numbers,
$e_i$ is relatively prime to $\text{lcm}(p_{i,1}-1, p_{i,2}-1, \ldots, p_{i,k}-1)$,
$d_i$ is selected from the group consisting of the class of numbers equivalent to a multiplicative inverse of $$e_i(\text{mod}(\text{lcm}((p_{i,1}-1), (p_{i,2}-1), \ldots, (p_{i,k}-1))))$$

a first one of the j communication stations including
  means for encoding a digital message word signal $M_A$ for transmission from said first one of the j communication stations (i=A) to a second one of the j communication stations (i=B),
  means for transforming said message word signal $M_A$ to one or more message block word signals $M_A''$, each block word signal $M_A'$ being a number representative of a portion of said message word signal $M_A'$ in the range $0 \leq M_A \leq n_B-1$, and
  means for transforming each of said message block word signals $M_A''$ to a ciphertext word signal $C_A$, $C_A$ corresponding to a number representative of an encoded form of said message block word signal $M_A''$, whereby:

$$C_A \equiv M_A''^{Eb} (\text{mod } n_B).$$

12. The system of claim 11 further comprising:
  means for transmitting said ciphertext word signals from said first terminal to said second terminal, and
  wherein said second terminal includes means for decoding said ciphertext word signals to said message word signal MA, said second terminal including:
  means for transforming each of said ciphertext word signals $C_A$ to one of said message block word signals $M_A''$, whereby $$M_A'' \equiv C_A^{Db} (\text{mod } n_B)$$

means for transforming said message block word signals $M_A''$ to said message word signal $M_A$.

13. In a communications system, including first and second communicating stations interconnected for communication therebetween,
  the first communicating station having
    encoding means for transforming a transmit message word signal M to a ciphertext word signal C where M corresponds to a number representative of a message and $$0 \leq M \leq n-1$$

where n is a composite number having at least 3 whole number factors greater than one, the factors being distinct prime numbers, and
    where C corresponds to a number representative of an enciphered form of said message and corresponds to $$C \equiv a_e M^e + a_{e-1} M^{e-1} + \ldots + a_0 (\text{mod } n)$$

where e and $a_e, a_e-1, \ldots, a_0$ are numbers; and
    means for transmitting the ciphertext word signal C to the second communicating station.

* * * * *